US008521128B1

(12) United States Patent
Welsh et al.

(10) Patent No.: US 8,521,128 B1
(45) Date of Patent: Aug. 27, 2013

(54) METHOD, SYSTEM, AND COMPUTER PROGRAM PRODUCT FOR OBTAINING CROWD-SOURCED LOCATION INFORMATION

(75) Inventors: Martha Welsh, Mountain View, CA (US); Douglas Rinckes, Zürich (CH)

(73) Assignee: Google Inc., Mountain View, CA (US)

( * ) Notice: Subject to any disclaimer, the term of this patent is extended or adjusted under 35 U.S.C. 154(b) by 67 days.

(21) Appl. No.: 13/315,748

(22) Filed: Dec. 9, 2011

(51) Int. Cl.
*H04M 11/04* (2006.01)

(52) U.S. Cl.
USPC .................. 455/404.2; 455/456.3; 455/414.3; 455/517

(58) Field of Classification Search
USPC .. 455/456.1–457, 404.1, 404.2, 414.1–414.3, 455/421; 340/995.1
See application file for complete search history.

(56) References Cited

U.S. PATENT DOCUMENTS

| | | | | |
|---|---|---|---|---|
| 5,677,837 A | * | 10/1997 | Reynolds | 455/456.3 |
| 5,802,492 A | * | 9/1998 | DeLorme et al. | 455/456.5 |
| 6,150,961 A | * | 11/2000 | Alewine et al. | 340/995.1 |
| 6,571,279 B1 | * | 5/2003 | Herz et al. | 709/217 |
| 7,149,504 B1 | * | 12/2006 | Weaver et al. | 455/414.2 |
| 7,424,218 B2 | | 9/2008 | Baudisch et al. | |
| 7,630,737 B2 | * | 12/2009 | Pande et al. | 455/556.1 |
| 7,966,008 B2 | * | 6/2011 | Graves et al. | 455/420 |
| 8,081,965 B2 | * | 12/2011 | Londhe | 455/421 |
| 8,120,641 B2 | | 2/2012 | Kang et al. | |
| 8,189,964 B2 | | 5/2012 | Flynn et al. | |
| 8,200,247 B1 | * | 6/2012 | Starenky et al. | 455/456.3 |
| 8,239,277 B2 | * | 8/2012 | Lee et al. | 705/26.1 |
| 8,310,522 B2 | | 11/2012 | Jeong et al. | |
| 2002/0107965 A1 | | 8/2002 | Piccionelli | |
| 2004/0235493 A1 | * | 11/2004 | Ekerborn | 455/456.1 |
| 2006/0079200 A1 | | 4/2006 | Hirouchi | |
| 2007/0024527 A1 | | 2/2007 | Heikkinen | |
| 2008/0045236 A1 | * | 2/2008 | Nahon et al. | 455/456.1 |
| 2008/0119131 A1 | | 5/2008 | Rao | |

(Continued)

FOREIGN PATENT DOCUMENTS

| | | |
|---|---|---|
| AU | 2008212499 A1 | 12/2008 |
| DE | 10156414 A1 | 9/2002 |
| KR | 2010124947 A | 11/2010 |
| WO | 2010090906 A2 | 8/2010 |

OTHER PUBLICATIONS

Dao, et al., "Location Based Services: Technical and Service Issues", GPS Soutions, 2002.
Nurminen, Antii, "Mobile 3D City Maps", IEEE Computer Graphics and Applications, Jul./Aug. 2008, pp. 20-31.
ISR/WO for PCT App. No. PCT/US12/59853, mailed on Mar. 8, 2013. (pp. 1-10).

(Continued)

*Primary Examiner* — Sharad Rampuria
(74) *Attorney, Agent, or Firm* — Bracewell & Giuliani, LLP

(57) ABSTRACT

Systems, methods, computer programs, and user interfaces are provided to receive a first location tag from a first user device, the first location tag including a first location category and a first device location of the first user device, receive a second location tag from a second user device, the second location tag including the first location category and a second device location of the second user device, determine that a distance between the first device location and the second device location is less than a distance threshold, and store the first device location as a first point of interest in a points of interest layer in response to determining that the distance is less than the distance threshold, the points of interest layer being associated with the first location category.

20 Claims, 9 Drawing Sheets

(56) References Cited

U.S. PATENT DOCUMENTS

| | | |
|---|---|---|
| 2009/0157876 A1 | 6/2009 | Lection |
| 2010/0009700 A1 | 1/2010 | Camp, Jr. et al. |
| 2010/0161506 A1 | 6/2010 | Bosenick |
| 2010/0241496 A1* | 9/2010 | Gupta et al. ............... 705/14.1 |
| 2010/0250305 A1* | 9/2010 | Lee et al. ..................... 705/7 |
| 2010/0309225 A1 | 12/2010 | Gray |
| 2011/0071843 A1 | 3/2011 | Gilvar |
| 2011/0102605 A1 | 5/2011 | Hannaford |
| 2011/0154264 A1 | 6/2011 | Aravamudan |
| 2011/0161002 A1 | 6/2011 | Devries |
| 2011/0165893 A1 | 7/2011 | Hyung |
| 2011/0312374 A1 | 12/2011 | Chen et al. |
| 2012/0264447 A1* | 10/2012 | Rieger, III ............... 455/456.1 |
| 2012/0268252 A1* | 10/2012 | Lee et al. ................. 340/10.1 |
| 2012/0300020 A1 | 11/2012 | Arth et al. |
| 2013/0033568 A1 | 2/2013 | Kim et al. |

OTHER PUBLICATIONS

Co-pending U.S. Appl. No. 13/662,073 entitled "Method, System, and Computer Program Product for Gamifying the Process of Obtaining Panoramic Images" by Evan Rapoport, filed Oct. 26, 2012.

Co-pending U.S. Appl. No. 13/272,556 entitled "Using augmented reality to drive user-generated photos" by David Bort, filed Oct. 13, 2011.

Co-pending U.S. Appl. No. 13/662,124 entitled "Method, System, and Computer Program Product for Providing a Target User Interface for Capturing Panoramic Images" by Scott Ettinger, filed Oct. 26, 2012.

Co-pending U.S. Appl. No. 13/858,514 entitled "Systems and Methods for Updating Panoramic Images" by Daniel Joseph Filip, filed Apr. 8, 2013.

\* cited by examiner

METHOD, SYSTEM, AND COMPUTER PROGRAM PRODUCT FOR OBTAINING CROWD-SOURCED LOCATION INFORMATION

TECHNICAL FIELD

The present disclosure relates to a process for obtaining crowd-sourced location information. More specifically, embodiments of the present disclosure process location tags from mobile user devices to determine points of interest.

BACKGROUND

Location information for geographically distributed features (e.g., restaurants, bus stops, stores, etc.) are useful in a variety of applications. For example, map services may store points of interest of geographically distributed features and provide those points of interest to users in response to a user request for a map of a geographic location. The points of interest are also useful for performing map searches for identifying a point of interest, e.g., locating a nearby restaurant or store based on a specified category or business name. The points of interest are also useful for providing turn-by-turn directions to a point of interest of a particular category or business name, e.g., turn-by-turn directions to the nearest bus stop.

Certain applications based on points of interest of geographically distributed features are often missing data for particular categories (e.g., restrooms, automatic teller machines, etc.) of the points of interest. Certain points of interest may not be verified. Or the points of interest may lack desirable attributes, such as descriptions of the points of interest, user ratings of the points of interest, etc.

SUMMARY

Various embodiments of systems, methods, computer programs, and user interfaces for obtaining crowd-sourced location information are described herein. In some aspects, provided are a system, method, computer program, and user interface for receiving a first location tag from a first user device, the first location tag including a first location category and a first device location of the first user device, receiving a second location tag from a second user device, the second location tag including the first location category and a second device location of the second user device, determining that a distance between the first device location and the second device location is less than a distance threshold, and storing the first device location as a first point of interest in a points of interest layer in response to determining that the distance is less than the distance threshold, the points of interest layer being associated with the first location category.

In some aspects, the system, method, computer program, and user interface are further for receiving a location image from the first user device and performing optical character recognition on the location image to obtain location information associated with the first point of interest.

In some aspects, the system, method, computer program, and user interface are further for receiving negative feedback from a third user device that the first point of interest has incorrect data, obtaining a user history of a user of the first user device, modifying the user history to decrease a reputation of the user of the first user device, and deleting the first point of interest from the points of interest layer.

In some aspects, the system, method, computer program, and user interface are further for receiving a user identifier and a third location tag from a third user device, the third location tag including the first location category and a third device location of the third user device, obtaining a user history based on the user identifier, the user history being associated with a user of the third user device, generating a moderation request including the user history and the third location tag, receiving approval of the third location tag from a moderator, the moderator approving the third location tag based on the moderation request, and storing the third device location as a second point of interest in the points of interest layer in response to receiving the approval.

In some aspects, the system, method, computer program, and user interface are further for receiving a number of location tags from a first group of user devices, each of the location tags including a second location category and an emergency location, determining the second location tag is an emergency location tag, and broadcasting a notification of the emergency location to a second group of user devices.

In some aspects, the system, method, computer program, and user interface are further for sending to the first user device a confirmation that a user incentive has been awarded to a user of the first user device and broadcasting a notification of the user incentive to a social network of the user.

In some aspects, provided are a system, method, computer program, and user interface for displaying a number of location categories on a display of a user device, each of the location categories being associated with a points of interest map layer, receiving a notification of a selected location category of the location categories, determining a device location based on a signal from a positioning device, and sending a location tag including the device location and the selected location category to an application server.

In some aspects, the system, method, computer program, and user interface are further for obtaining a location image from a camera of the user device, the location tag further including the location image.

In some aspects, the system, method, computer program, and user interface are further for displaying a request for confirmation of the selected category on the display until a timeout period expires, the location tag being sent to the application server in response to the timeout period expiring.

Figure 1A:
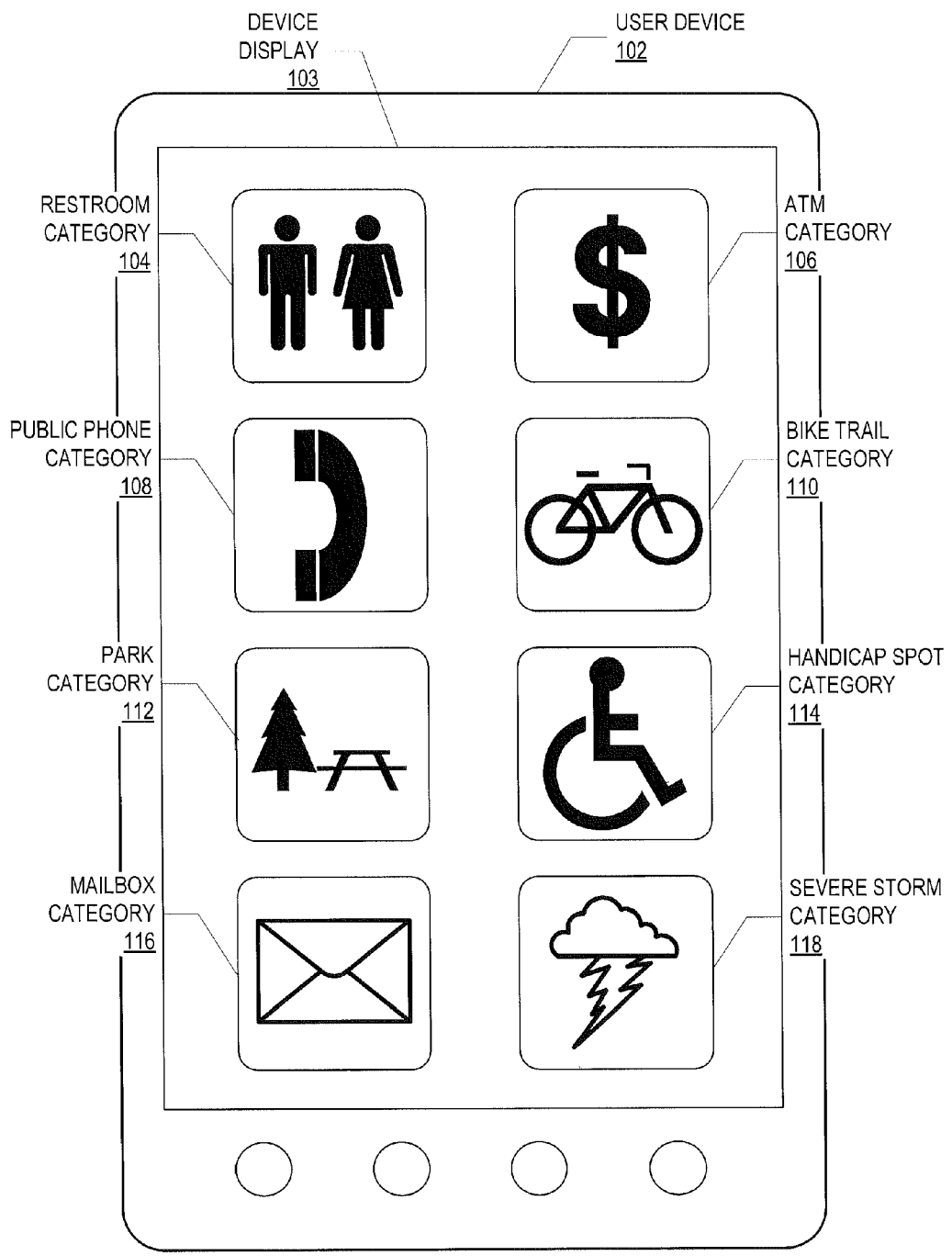
FIGS. 1A-1B show an example user interface in accordance with one or more embodiments.

While obtaining crowd-sourced location information is susceptible to various modifications and alternative forms, specific embodiments thereof are shown by way of example in the drawings and will herein be described in detail. The drawings may not be to scale. It should be understood, however, that the drawings and detailed description thereto are not intended to limit obtaining crowd-sourced location information to the particular form disclosed, but to the contrary, the intention is to cover all modifications, equivalents, and alternatives falling within the spirit and scope of the present disclosure as defined by the appended claims.

DETAILED DESCRIPTION

As discussed in more detail below, provided in some embodiments are systems and methods for obtaining crowd-sourced location information (e.g., locations for restrooms, automated teller machines, public phones, etc.), which may be useful for a map service, a social network, or other applications in which points of interest are presented or analyzed. In one embodiment, the process for obtaining crowd-sourced location information includes the steps of receiving a first location tag from a first user device, the first location tag including a first location category and a first device location of the first user device, receiving a second location tag from a second user device, the second location tag including the first location category and a second device location of the second user device, determining that a distance between the first device location and the second device location is less than a distance threshold, and storing the first device location as a first point of interest in a points of interest layer for the first location category.

A point of interest may include geographic coordinates and associated metadata describing the point of interest. For instance, a discrete building, natural feature, restaurant, tourist attraction, artwork, bridge, or other notable geographic location may be represented as a point of interest. In this case, metadata describing the point of interest may include an image of the point of interest, a description of the point of interest, a data source of the point of interest, a timestamp for the collection of the point of interest, etc.

FIG. 1 shows an example interface in accordance with embodiments of obtaining crowd-sourced location information. More specifically, FIG. 1 shows an example user interface for collecting location information on a mobile user device 102.

The mobile user device 102 includes a device display 103 displaying a user interface for collecting location information. Examples of device display 103 technologies include multi-touch capacitive screens, organic light emitting diode (OLED) screens, etc. The user interface includes buttons for categories of points of interest. Specifically, the user interface includes a restroom category button 104, an automated teller machine (ATM) category button 106, a public phone category button 108, a bike trail category button 110, a park category button 112, a handicap spot category button 114, a mailbox category button 116, and a severe storm category button 118. The category buttons shown in FIG. 1 are exemplary, and the user interface may be configured to include a variety of category buttons.

Figure 1B:
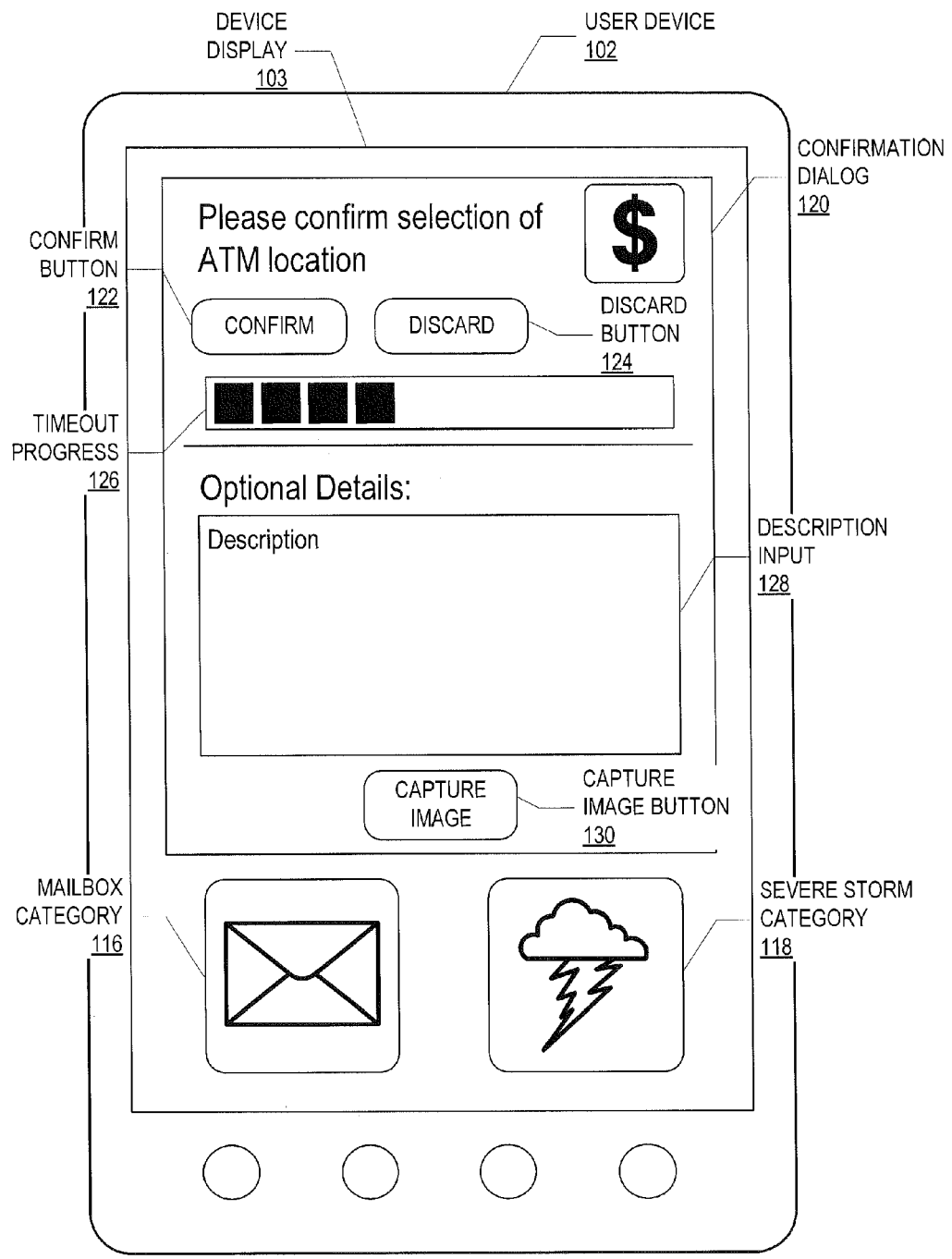

In some embodiments, selection of a category button initiates a confirmation dialog 120 as shown in FIG. 1B. In this example, the selection is of an ATM category button 106 of FIG. 1A. The confirmation dialog 120 displays a request for the user to confirm 122 or discard 124 the selection of the ATM category button 106 of FIG. 1A. The confirmation dialog 120 also includes a timeout progress 126 displaying a timeout period after which the selection of the ATM category button 106 of FIG. 1A will automatically be confirmed 122. If the selection of the category button is confirmed 122, a current location of the user device 102 is determined (e.g., using a global positioning system (GPS)) and submitted to a server (e.g., an application server) as a potential location of an ATM.

In some embodiments, the confirmation dialog 120 also requests optional details including a description input 128 and a capture image button 130. The user may enter a description of the potential location using the description input 128, where the description is submitted to the server along with the current location of the user device 102. The user may also select the capture image button 130 to capture an image at the current location using a camera (not shown) of the user device 102, where the image is submitted to the server along with the current location of the user device 102.

Figure 2:
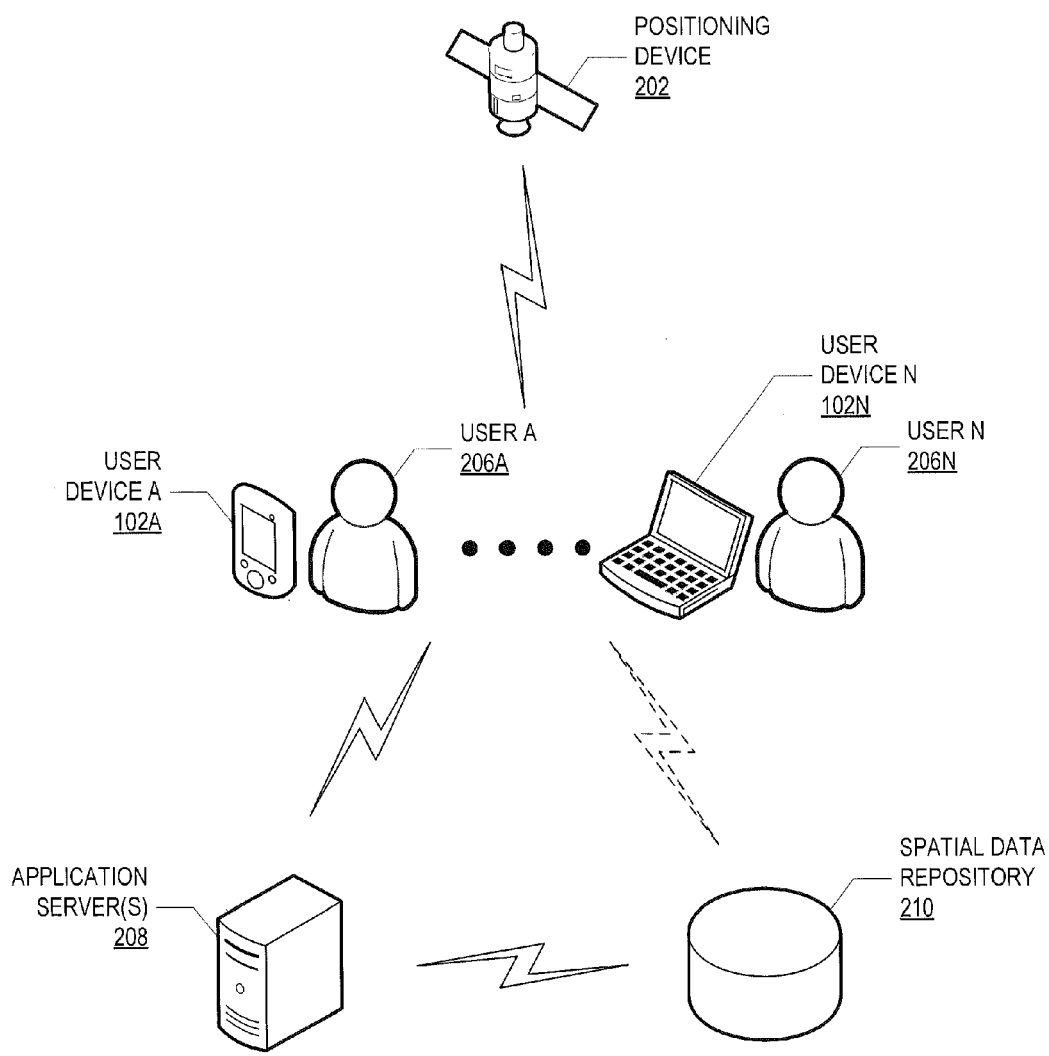
FIGS. 2 and 3A-3D show diagrams of systems in accordance with one or more embodiments.

FIG. 2 shows a diagram of a system in accordance with one embodiment. The system of this embodiment includes a positioning device 202 interacting with user devices (e.g., user device A 102A and user device N 102N), which in turn interact with application server(s) 208. Further, the illustrated application server 208 stores information in a spatial data repository 210. FIG. 2 describes further aspects of the aforementioned components of FIG. 2.

In some embodiments, the global positioning device 202 broadcasts radio frequency ("RF") signals that may be received by a number of user devices (e.g., user device A 102A, user device N 102N). As discussed below with respect to FIG. 2, the positioning device 202 may be part of a global positioning system ("GPS") including multiple satellites. Each of the user devices (e.g., user device A 102A, user device N 102N) may use the RF signals to determine their location, e.g., their global geographic location or their geographic location relative to some reference point, such as a center of a city, a building, or some arbitrarily selected reference.

Examples of user devices (e.g., user device A 102A, user device N 102N) include smartphones, tablet computers, laptop computers, etc. Each of the user devices (e.g., user device A 102A, user device N 102N) may be equipped with a camera configured to capture images. The user devices may be configured to collect location tags using the location obtained from the positioning device 202. A location tag may include a geographic location (e.g., latitude and longitude) and a category (e.g., restrooms, automated teller machines, public phones, etc.) of points of interest. As shown in FIG. 2, the user devices (e.g., user device A 102A, user device N 102N) in this example are operated by users (e.g., user A 206A, user N 206N).

In some embodiments, the application server(s) 208 may be a map service server, which may be implemented on multiple computing devices (i.e., servers), where a load balancing scheme distributes requests across the multiple computing devices. The application server 208 may be configured to provide spatial data (e.g., maps, geographic coordinates, directions, etc.) to the user devices (e.g., user device A 102A, user device N 102N). For example, the application server 208 may provide a map displayed on user device A 102A, where user A 206A uses the map to locate a nearby point of interest. Alternatively or additionally, the application server 208 may, in some embodiments, also provide images for the points of interest, such as images of a building, path, road, waterway, or other feature, which are viewed by the user A 206A on the user device A 102A. The map service server 208 may be configured to obtain points of interest for maps from the spatial data repository 210. In some embodiments, additional repositories at the same or different location as the spatial data repository 210 may also be queried by the map service server 208 to generate maps of the points of interest for the user devices (e.g., user device A 102A, user device N 102N).

In some embodiments, the application server 208 is configured to obtain and store points of interest. The stored points of interest may be later transmitted by the application server 208 in response to requests from user devices for maps of locations, or the stored points of interest may be analyzed by a spatial data analysis module, e.g., to verify the validity of the points of interest, to reduce duplicates in the pointes of interest, etc. Specifically, in this embodiment, the application server 208 is configured to receive location tags describing potential points of interest from the user devices (e.g., user device A 102A, user device N 102N). The users (e.g., user A 206A, user N 206N) are encouraged to obtain location tags by an application such as the one described above with respect to FIGS. 1A-1B.

For example, as user A 206A is traveling, the user A 206A discovers an ATM in Houston, Tex. In this example, the user A 206A launches a collection application on the user device A 102A that is configured to collect location tags. The user A 206A may then select an ATM category in the collection application to collect the ATM's location as a potential point of interest. After the ATM category is selected, the user device A 102A may obtain a current location using the positioning device 202. At this stage, the user device 102A may send a location tag including the current location and the selected ATM category to the application server 208 as a potential point of interest. The collection application on the user device A 102A may reward the user A 206A for the submission. For example, the user A 206 A may be awarded a social reward (e.g., achievement points, a virtual trophy, increased reputation, etc.) on a social networking service.

In this example, a user N 206N may discover the same ATM in Houston, Tex. and also submit a second location tag for the ATM from user device N 102N to the application server 208 as a potential point of interest. The application server 208 may use the second location tag to verify the validity of the ATM's location if the location tags are within a predetermined distance. In this case, the validity of the ATM's location may improve as additional location tags are received. Alternatively or additionally, the location tags may be verified by a moderator (not shown) who compares locations in the location tags to other spatial data (e.g., streets, known points of interest, etc.). For example, the moderator may determine that the potential location of an ATM is invalid if the potential location is in an isolated area with no surrounding businesses such as a gas station, a bank, etc.

As location tags are received by the application server 208, the images are stored in the spatial data repository 210 in some embodiments. Further, the application server 208 may also evaluate whether certain points of interest are stale (e.g., older than a threshold time specified in days, months, years, etc.), and in response to determining that a point of interest is stale, the application server 208 may designate the point of interest as requiring further verification.

Figure 3A:
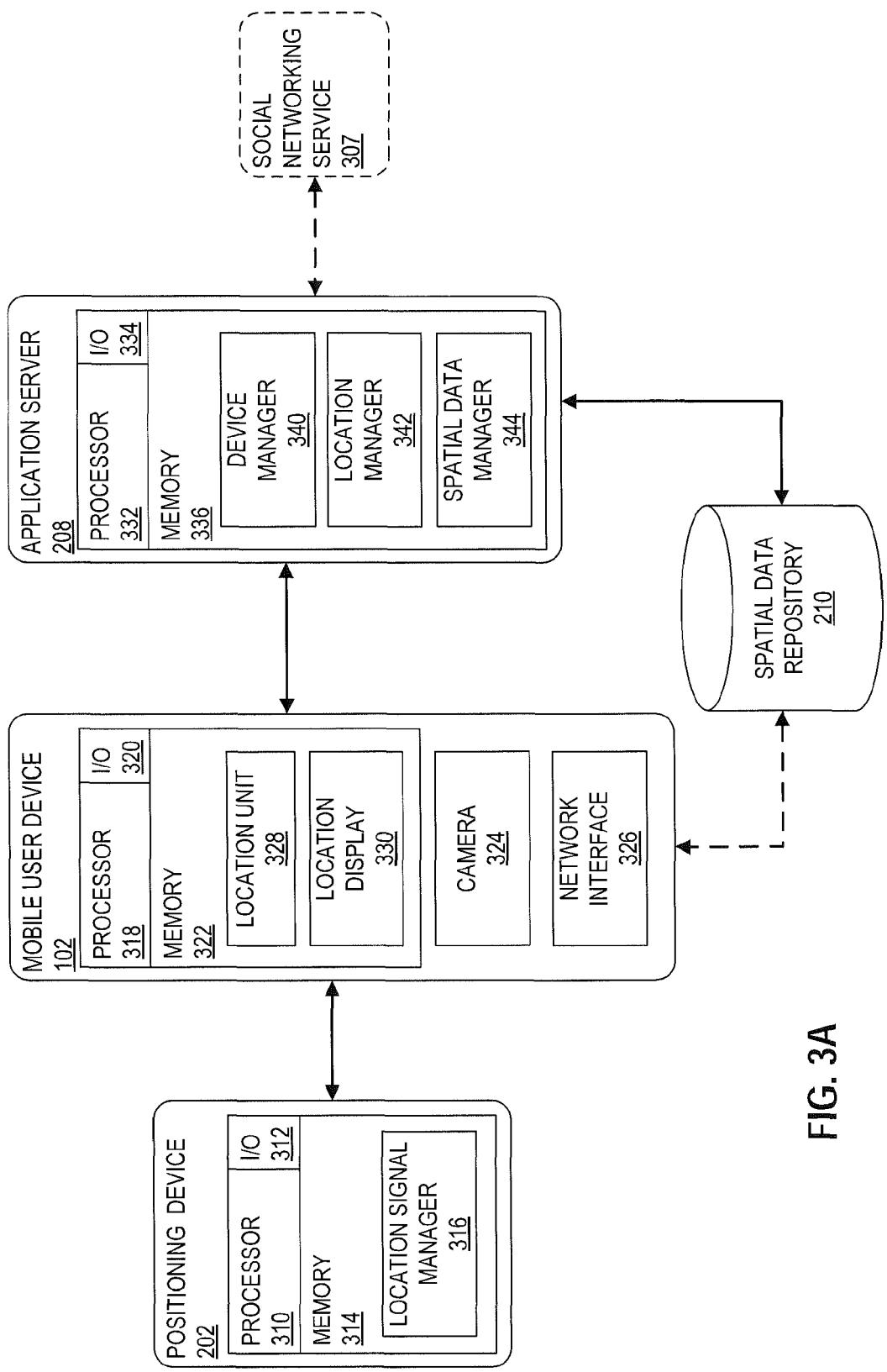

FIG. 3A shows a diagram of a system in accordance with some embodiments of obtaining crowd-sourced location information. The example system includes a positioning device 202 communicating with (e.g., interacting, receiving broadcasts from, or transmitting broadcasts to) a mobile user device 102, which in turn interacts with an application server 208. Further, the application server 208 of this embodiment stores information in a spatial data repository 210 and, optionally, interacts with a social networking service 307.

In some embodiments, the positioning device 202 is configured to provide location information indicative of the location of the mobile user device 102. Specifically, the location signal manager 316 of the positioning device 202 may include a signal transmitter 346 of FIG. 3B configured to provide radio frequency ("RF") signals to the mobile user device 102, where the RF signals allow the mobile user device 102 to determine a global location of the mobile user device 102. For example, the positioning device 202 may correspond to a global positioning system (GPS), which includes multiple satellites that broadcast RF signals and navigation messages. In this example, the RF signals are used by the mobile user device 102 to determine the distance to a satellite, and the navigation messages are used to determine the location of each of the satellites. In another example, the positioning device 202 may correspond to mobile network towers, where the signal strengths of the mobile network towers with respect to the mobile user device 102 are used to determine a location of the mobile user device 102. Examples of communication standards implemented on mobile network towers include $3^{rd}$ generation mobile telecommunications standards (3G) and $4^{th}$ generation mobile telecommunication standards (4G) such as long term evolution (LTE) and worldwide interoperability for microwave access (WiMAX), etc. In some embodiments, the signal configuration used by the signal transmitter 346 of FIG. 3B is stored in the signal configuration repository 350 of FIG. 3B. For example in the case of GPS, the signal configuration repository 350 stores (1) orbital information of the positioning device 202 and (2) general system health and rough orbits of all the GPS satellites.

As shown in FIG. 3B, the location signal manager 316 may include a user signal receiver 348 of FIG. 3B configured to receive an RF signal. For example, if the positioning device 202 is the GPS, the user signal receiver 348 of FIG. 3B is configured to receive GPS signals from GPS satellites, where a user location determiner 352 of FIG. 2B is configured to determine a global location of the mobile user device 102 based on the GPS signals. In another example, if the positioning device 202 is a mobile network tower, the user signal receiver 348 of FIG. 3B is configured to receive an RF signal from the mobile user device 102, where the user location determiner 352 of FIG. 3B is configured to determine a relative location of the mobile user device 102 based on the strength of the RF signal. In some embodiments, the user signal receiver 348 of FIG. 3B is configured to receive signals from multiple sources (e.g., GPS signals, RF signals from mobile network towers or wireless access points) in which case the user location determiner 352 of FIG. 3B is configured to determine the location by applying a hybrid positioning algorithm to all the signals.

In some embodiments, the positioning device 202 includes a processor 310, an input/output module 312, and memory 314. The positioning device 202 may include various types of computing devices that execute an operating system. The processor 310 may execute instructions, including instructions stored in the memory 314. The instructions, like the other instructions executed by computing devices herein, may be stored on a non-transitory computer readable medium such as an optical disk (e.g., compact disc, digital versatile disk, etc.), a flash drive, a hard drive, or any other computer readable storage device. The input/output module 312 of the positioning device 202 may include an input module, such as a radio frequency sensor, a keyboard, and/or a mouse, and an output module, such as a radio frequency transmitter, a printer, and/or a monitor. The positioning device 202 may be connected to a local area network (LAN) or a wide area network (e.g., the Internet) via a network interface connection. In some embodiments, the input/output module 312 may take other forms.

In some embodiments, the mobile user device 102 is a mobile personal computer. For example, the mobile user device 102 may be a laptop computer, a smartphone, a tablet computer, a navigation device, a wirelessly-networked imaging device, a wirelessly-networked e-reader, an on-board computer of a vehicle, or other device configured to be readily transported with a user over distance while maintaining a connection to a network. In some embodiments, the mobile user device 102 includes a network interface 326 configured to send data to and receive data from the application server 208. For instance, the network interface 326 may send location tags to and receive maps from the application server 208.

In some embodiments, the mobile user device 102 includes a camera 324 configured to capture images, such as in a video format or as still images, including stereoscopic video or still images. For instance, the camera 324 may include one or more image sensors configured to capture images of light within the visible spectrum for use by the mobile user device 102.

In some embodiments, the mobile user device 102 includes a processor 318, an input/output module 320, and a memory 322. The mobile user device 102 may be implemented as a computing device with an operating system, stored in the memory 322, for interacting with a user. For example, the operating system may be configured to provide applications (e.g., map application, social networking application, etc.) to the user. In some embodiments, the memory 322 includes a location unit 328 and a location display module 330.

In some embodiments, the location unit 328 of the mobile user device 102 is configured to obtain a location of the mobile user device based on location information received from the positioning device 202. Specifically, the location unit 328 may include a location determiner 360 of FIG. 3C configured to determine a global location of the mobile user device 102 based on location information received from the positioning device 202. For example, the location determiner 360 of FIG. 3C may determine the absolute location of the mobile user device 102 based on GPS signals received from GPS satellites using the signal receiver 358 of FIG. 3C. In this example, the absolute location may be geographic coordinates (e.g., latitude, longitude, elevation) identifying the location of the mobile user device 102 in a geographic coordinate system. In another example, the location determiner 360 of FIG. 3C may triangulate the relative location of the mobile user device 102 based on mobile phone signals received from one or more mobile network towers. In this example, the relative location may specify the location of the mobile user device 102 with reference to the mobile network towers.

Figure 3C:
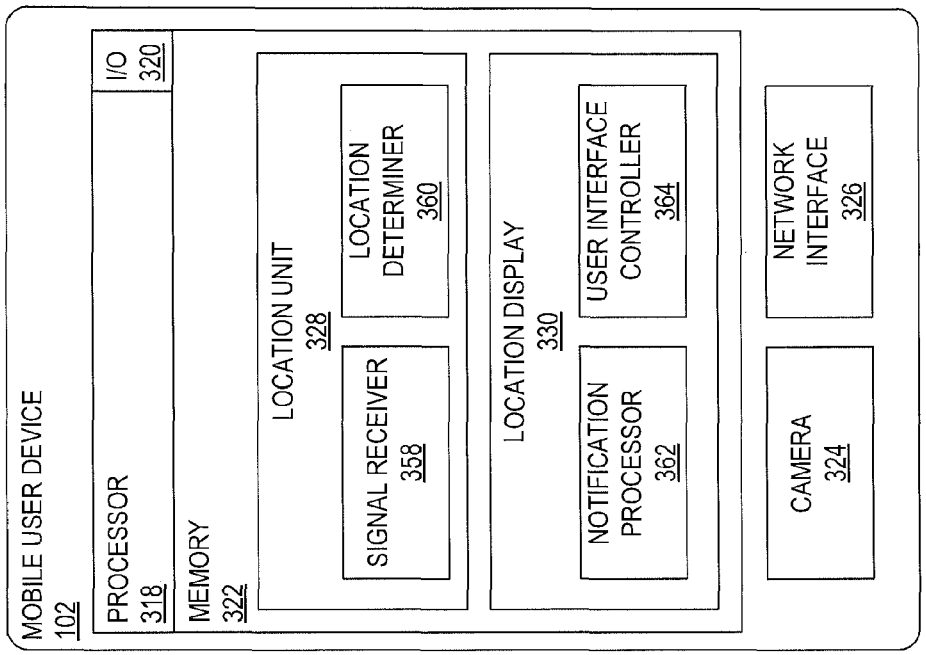
Figure 3B:
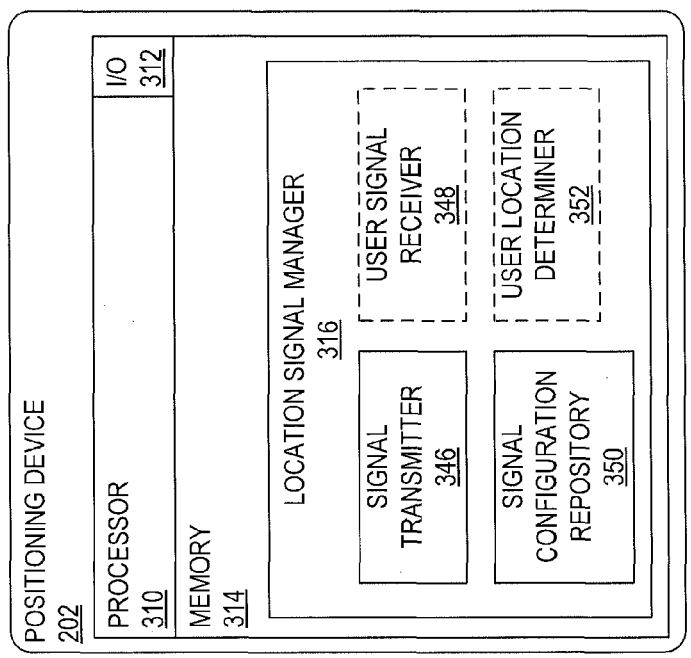

After the location determiner 360 of FIG. 3C determines the location of the mobile user device 302, the location may be provided to the location display 330, which may associate the location with a point of interest category. The location display 330 may also associate other data with the location, e.g., the time at which the location was determined and data indicative of the accuracy of the location, such as a tolerance indicating that the location is accurate within some radius of the actual location of the mobile user device. In some embodiments, the signal receiver 358 of FIG. 3C is configured to receive RF signals from the signal transmitter 346 of the positioning device 202 to determine the location.

In some embodiments, the location display module 330 of the mobile user device 102 is configured to obtain location information from a user for the application server 208. In some embodiments, the location display module 330 may include a user interface controller 364 of FIG. 3C configured to display guidance for capturing location information on a display screen (not shown) of the mobile user device 102. For example, the user interface controller 364 of FIG. 3C may display buttons for categories (e.g., restrooms, ATM's, public phones, etc.) of points of interest. In this example, the user interface controller 364 of FIG. 3C may display a location input dialog in response to the selection of a category, where the location input dialog allows the user to generate location tags for the application server 208. A location tag may include (1) the location of the mobile user device 102 as determined by the location unit 328 and (2) the category selected by the user.

In some embodiments, the notification processor 362 of FIG. 3C of the location display module 330 is configured to display confirmation of a user reward on a display screen of the mobile user device 102. For example, the notification processor 362 of FIG. 3C displays confirmation that the user reward has been awarded in response to the submission of a location tag. In some embodiments, the notification processor 362 of FIG. 3C is configured to display social networking information of other users to encourage the user to collect location information. For example, the notification processor 362 of FIG. 3C may display user reputations of the other users describing their historical submissions of location tags.

In some embodiments, the application server 208 is a computing device configured to provide application services (e.g., map services, image services, etc.) to a number of client devices such as the mobile user device 102. In some embodiments, the application server 208 includes a processor 332, an input/output module 334, and memory 336. The application server 208 may include various types of computing devices that execute an operating system. The processor 332 may execute instructions, including instructions stored in the memory 336. The instructions, like the other instructions executed by computing devices herein, may be stored on a non-transitory computer readable medium such as an optical disk (e.g., compact disc, digital versatile disk, etc.), a flash drive, a hard drive, or any other computer readable storage device. The input/output module 334 of the application server 208 may include an input module, such as a radio frequency sensor, a keyboard, a touch screen, and/or a mouse, and an output module, such as a radio frequency transmitter, a printer, and/or a monitor. The application server 208 may be connected to a local area network (LAN) or a wide area network (e.g., the Internet) via a network interface connection. In some embodiments, the input/output module 334 may take other forms.

Further, the application server 208 may be implemented as a node of a distributed system, where the other portions of the distributed system are located on different nodes. The nodes of the distributed system may correspond to computing devices as discussed above. Alternatively, the nodes of the distributed system may correspond to multiple processors/cores with shared memory in a single computing device. In some embodiments, the memory 336 includes a device manager 340, a location manager 342, and a spatial data manager 344. The aforementioned components of the application server 208 may be implemented on multiple computing devices (i.e., servers), where a load balancing scheme distributes requests across the multiple computing devices.

In some embodiments, the device authorizer module 340 of the application server 208 is configured to manage user sessions for user devices (e.g., mobile user device 102). For example, the device authorizer module 340 of this embodiment includes a device interface 370 of FIG. 3D configured to authenticate credentials from the mobile user device 102 when initiating a user session. In this example, the mobile user device 102 is not authorized to interact with the application server 208 until the credentials are confirmed to be valid by the device interface 370 of FIG. 3D. In some embodiments, the device manager 340 also includes a credentials repository 372 of FIG. 3D configured to store encrypted credentials used to authorize the users of the application server 208.

Figure 3D:
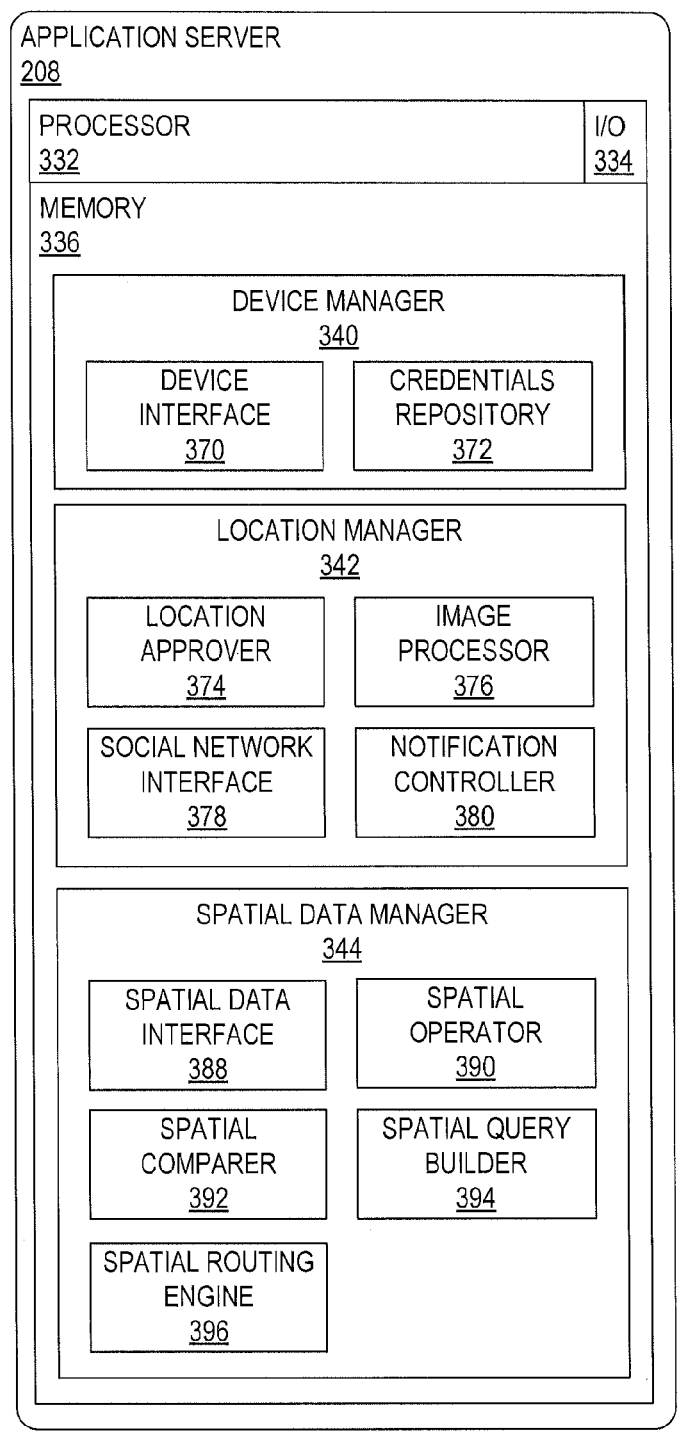

In some embodiments, the device interface 370 of FIG. 3D of the device authorizer module 340 of the application server 208 may also be configured to interact with a social networking service 307 on behalf of the mobile user device 102. In this case, the device interface 370 of FIG. 3D is configured to request authorization to access the social networking service 307 from the mobile user device 102. Once authorized, the device interface 370 of FIG. 3D may interact with the social networking service 307 to provide social rewards (further discussed below) in response to location information provided by the mobile user device 102.

In some embodiments, the location manager module 342 of the application server 208 may be configured to manage location information from user devices (e.g., mobile user device 102). The location manager module 342 may include a location approver 374 of FIG. 3D configured to receive location tags from the mobile user device 102, where the location tags include location categories and device locations of mobile user devices (e.g., mobile user device 102) for potential points of interest. In this case, the location receiver 374 of FIG. 2D may be configured to anonymize the location tags before they are stored to protect the identity of the users. For example, personal data identifying the user is stripped from the location information before the location information is stored in the memory 336. Further, the location information may only be obtained from the mobile user device 102 if the user elects to participate in location information collection for the application server 208. The location manager module 342 may also include a notification controller 380 of FIG. 3D configured to monitor the location tags submitted by user devices (e.g., mobile user device 102) and to direct the device manager 340 to provide historical information of the submitted location tags to the user devices.

In some embodiments, the location manager module 342 may include an image processor 376 that is configured to process images received from mobile user devices (e.g., mobile user device 102). For example, the image processor 376 of FIG. 3D may be configured to associated images with location tags received from the mobile user device 102. In this example, if a location tag is stored as a point of interest, the associated image may be stored as metadata of the point of interest in the spatial data repository 210.

In some embodiments, the image processor 376 of FIG. 3D may be configured to perform object recognition analysis on images received from the mobile user devices. For example, the image processor 376 of FIG. 3D may perform object recognition to identify objects (e.g., buildings, store fronts, text in signs, etc.) in the images. In this example, the objects identified by the image processor 376 of FIG. 3D may also be stored as metadata of the point of interest in the spatial data repository 210. For example, the image processor 376 of FIG. 3D may perform object recognition to recognize text on the sign of a store, where the text is stored as a description that is associated with a point of interest for the store.

In some embodiments, the spatial data manager 344 of the spatial data server 208 is configured to manage spatial data stored in the spatial data repository 210. The spatial data manager 344 may include a spatial data interface 388 of FIG. 3D configured to access and modify data in the spatial data repository 210. For example, the spatial data interface 388 of FIG. 3D may be configured to execute database commands to retrieve or modify database records in the spatial data repository 210. In an exemplary embodiment, the spatial data interface 388 of FIG. 3D may be used by the other modules (e.g., spatial operator 390, spatial comparer 392, spatial query builder 394, spatial routing engine 396) of the spatial data manager 344 to perform spatial or data operations.

In some embodiments, the spatial data manager 344 may include a spatial operator 390 of FIG. 3D configured to perform spatial operations on spatial data. Examples of spatial operations may include intersecting spatial features, snapping one spatial feature to another, unioning spatial features, buffering a spatial feature, and differencing spatial features. The spatial operator 390 of FIG. 3D may perform the spatial operations on spatial data retrieved from the spatial data repository 210 by the spatial data interface 388 of FIG. 3D. In this case, the results of the spatial operation may be stored in the spatial data repository 210 by the spatial data interface 388 of FIG. 3D.

In some embodiments, the spatial data manager 344 may include a spatial comparer 392 of FIG. 3D configured to perform spatial comparisons of spatial data. Examples of spatial comparisons may include determining a distance between spatial features, determining whether spatial features intersect, determining whether a spatial feature is contained by another spatial feature, determining whether a spatial feature contains another spatial feature, determining whether spatial features are disjoint, determining whether a spatial feature is equal to another spatial feature, and determining whether a spatial feature touches another spatial feature. The spatial comparer 392 of FIG. 3D may perform the spatial comparisons on spatial data retrieved from the spatial data repository 210 by the spatial data interface 388 of FIG. 3D.

In some embodiments, the spatial data manager 344 may include a spatial query builder 394 of FIG. 3D configured to generate database commands for retrieving or modifying spatial data in the spatial data repository 210. For instance, the spatial query builder 394 of FIG. 3D may build structured query language (SQL) statements for retrieving or modifying spatial data. In this case, the spatial data interface 388 of FIG. 3D may be configured to execute the SQL statements to retrieve or modify spatial data in the spatial data repository 210.

In some embodiments, the spatial data manager 344 may include a spatial routing engine 396 of FIG. 3D configured to determine routes based on route parameters. For instance, the spatial routing engine 396 of FIG. 3D may be configured to determine routes from start locations and end locations. In this case, each route may be determined using a routing algorithm having various configurations (e.g., obtain shortest route, obtain fastest route, avoid highways, avoid tollways, use public transportation) that are specified in the routing parameters. In an exemplary embodiment, the spatial routing engine 396 of FIG. 3D may determine a route represented by a polyline with associated route information (e.g., travel distance, travel time, turn-by-turn directions, etc.) based on spatial data from a road layer that is stored in the spatial data repository 210.

In some embodiments, the spatial data repository 210 is configured to store points of interest for use by a map service. The stored points of interest may be related to images, allowing the map service to use the stored images as spatial data when generating maps. The spatial data repository 210 may correspond to a server, a database, files, a memory cache, etc. that is stored locally (e.g., located on the application server) or shared on a network (e.g., a database server). In some embodiments, the mobile user device 102 may interact directly with the spatial data repository 210 to store collected location information. In some embodiments, metadata associated with the points of interest is stored in a separate repository (not shown). For example, the spatial data repository 210 and the separate repository may be organized in a distributed relational database architecture.

In some embodiments, spatial data describes the geographic location of features (e.g., points of interest, cities, geo-located images, etc.) and boundaries (e.g., rivers, county boundaries, state boundaries, country boundaries, etc.). Typically, spatial data is stored in the form of points, polylines, polygons, vectors, imagery, or some other shape. For example, geographic coordinates and associated metadata for points of interest may be stored in a point map layer. In another example, boundaries and associated metadata for geographic areas may be stored in a polygon map layer. Spatial queries may be performed between mapping layers by performing spatial comparisons (e.g., comparisons for intersections, comparisons for disjointedness, etc.) of the shapes in each of the mapping layers.

In some embodiments, the spatial data repository 210, or a related repository, is configured to store information related to the stored points of interest. For example, the spatial data repository 210 may also store the results of analysis (e.g., clustering points of interest, verifying points of interest, etc.) performed on the stored points of interest. In another example, the spatial data repository 210 may also store metadata (e.g., descriptions, collection timestamps, etc.) related to the stored points of interest.

Figure 4:
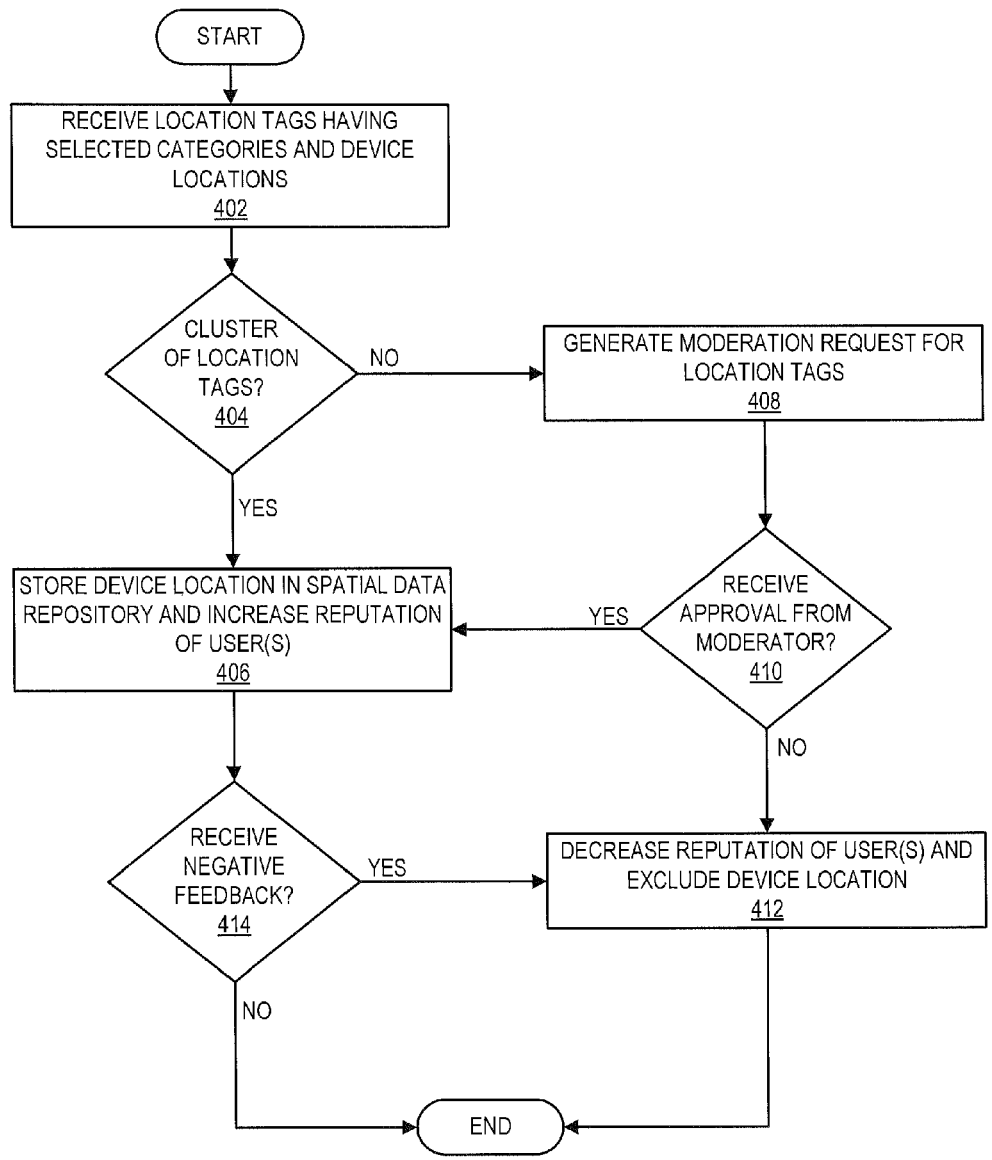
FIGS. 4-5 show flow charts in accordance with one or more embodiments.

FIG. 4 shows a flow chart in accordance with certain embodiments. More specifically, FIG. 4 is a flow chart of a method performed by an application server for obtaining location information from mobile user devices. The location information may be obtained for a map service or for other purposes. As is the case with the other processes described herein, various embodiments may not include all of the steps described below, may include additional steps, and may sequence the steps differently. Accordingly, the specific arrangement of steps shown in FIG. 4 should not be construed as limiting the scope of obtaining crowd-sourced location information.

In step 402 of the present embodiment, location tags having selected location categories are device locations are received from the mobile user devices. Specifically, each mobile user device may provide a location tag having a selected location category and a device location. The device locations may be determined using a positioning device such as GPS and/or mobile network towers. In addition, the mobile user devices may provide additional information with the location tags such as images, location descriptions, positioning parameters (e.g., accuracy of device location, type of positioning device used, etc.).

In step 404, a determination is made as to whether there is a cluster of location tags. A cluster of location tags may exist where a number of mobile devices submit location tags for the same location category within a predetermined distance threshold. A spatial comparison may be performed on the device locations of the location tags to determine whether the location tags are within the predetermined distance threshold. For example, if three mobile user devices each submit a location tag for an ATM within device locations within 300 feet of each other, the application server may determine that the three location tags form a cluster of location tags. A cluster of location tags may indicate that there is a higher probability that the location tags accurately describe the location of a point of interest.

In some embodiments, the number of mobile devices and/or the predetermined distance threshold for clustering may be configured. In this case, different configuration values may be used to reflect different levels of certainty that a cluster accurately describes a point of interest. In this example, the application server may be configured to recognize different levels of certainty and process the location tags according to its level of certainty (e.g., a first level requiring manual moderation, a second level being automatically verified, etc.).

If it is determined that there is a cluster of location tags, a device location of the location tags may be stored as a point of interest in a map layer in step 406. Further, a reputation of the user(s) may be increased based on the acceptance of the device location as a point of interest. The reputation of a user may correspond to the user's social reputation in a social network, where the social reputation describes the user's historical accuracy for submitting location tags. Once the device location is stored as a point of interest in the map layer, the point of interest may be included in maps provided by a map service. For example, if the device location is for an ATM location category, the device location may be stored in an ATM points of interest map layer that is configured to be provided as spatial data for the map service.

In some embodiments, if the category of the point of interest is emergency related, the points of interest map layer may be updated in real-time in order to provide notifications of the emergency information to users. For example, if the location tags identify the location of a severe storm, the cluster of location tags may be identified as being related to an emergency event. In this example, a notification of the severe storm may be generated and transmitted to users that have subscribed to receive emergency notifications. Other examples of emergency events include power outages, water outages, hazardous chemical spills, etc.

If it is determined that there is no cluster of location tags, a moderation request for the location tags is generated in step 408. The moderation request may include a location tag and user information associated with the submitter of the location tag. The moderation request may be submitted to a moderator for processing, where the moderator manually reviews the location tag to verify its validity. The moderator may consider a variety of factors when verifying the location tag including related spatial data (e.g., satellite imagery, nearby points of interest, nearby roads, etc.), a reputation of the submitter of the location tag, statistically data related to previous location tag submissions, etc.

In step 410, it is determined whether approval is received from the moderator in response to the moderation request. If approval is received from the moderator, the process proceeds to step 406. If approval is not received from the moderator, the reputation of the user may be decreased in step 412. Further, the device location of the location tag may be excluded from being stored in a spatial data repository.

In step 414, it is determined whether negative feedback is received for the device location that was stored as a point of interest. For example, another user of the map service may specify that the point of interest is invalid (e.g., does not exist at the device location, is improperly positioned at the device location, etc.). If a threshold number of users specify that the point of interest is invalid, negative feedback is received and the process proceeds to step 412. The threshold number of users for negative feedback may be proportional to any positive feedback provided by users for the point of interest.

Figure 5:
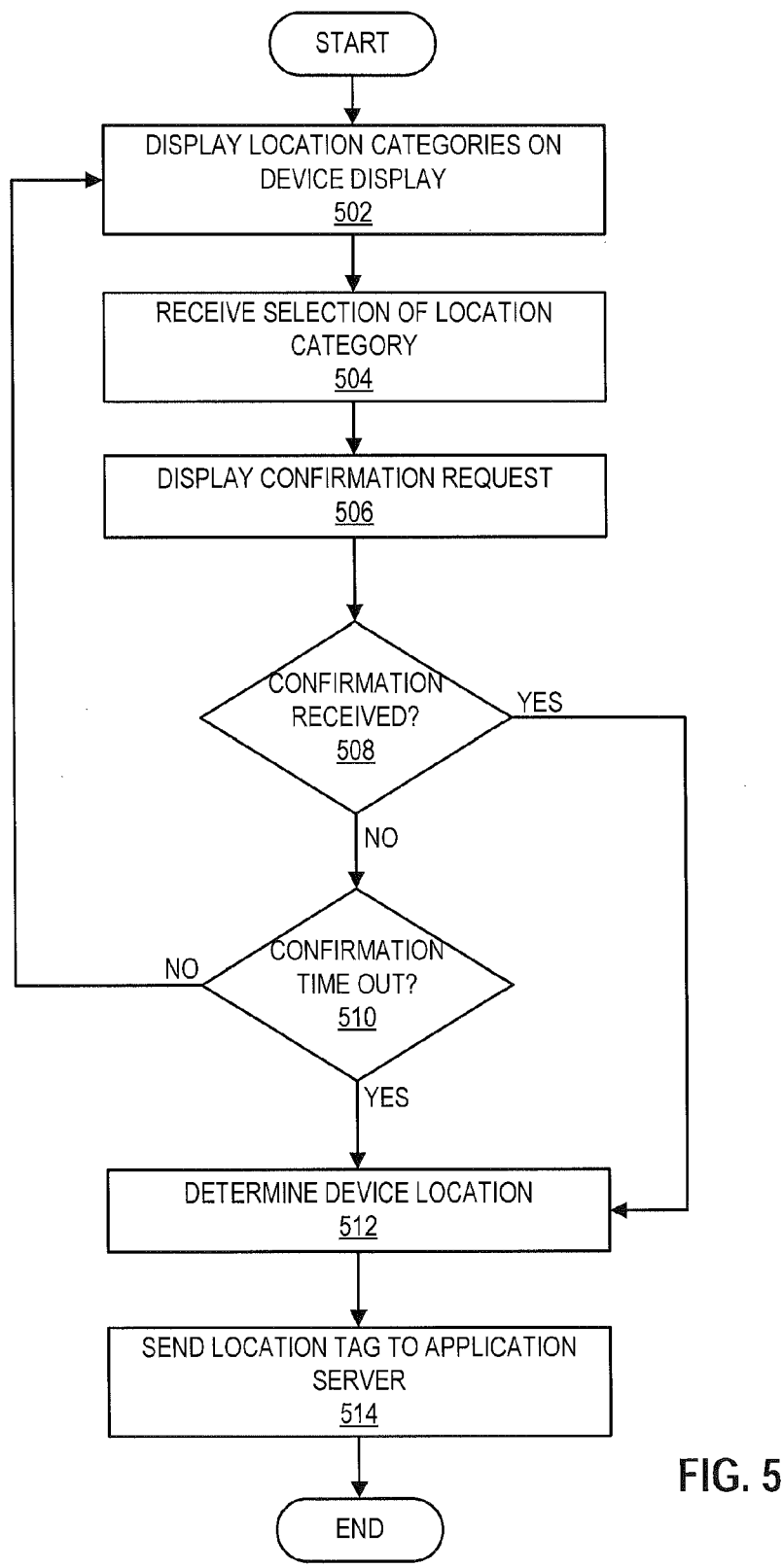

FIG. 5 shows a flow chart in accordance with certain embodiments of obtaining crowd-sourced location information. More specifically, FIG. 5 shows a flow chart of a method performed by a mobile user device to obtain location information for an application server. In one or more embodiments, one or more of the steps described below may be omitted, repeated, or performed in a different order. Accordingly, the specific arrangement of steps shown in FIG. 5 should not be construed as limiting the scope of obtaining crowd-sourced location information.

In step 502 of the present embodiment, location categories are displayed on a device display. For example, the device display may display a user interface as discussed above with respect to FIG. 1A. A variety of location categories may be displayed such as a restroom category, an ATM category, a public phone category, etc. In some embodiments, the location categories displayed may be updated periodically based on the needs of the map service. For example, the location categories may be prioritized based on the spatial data coverage of each of the location categories.

In step 504 of the present embodiment, a selection of a location category is received from the user of the user device. In response to receiving the selection of the location category, a confirmation request is displayed for the user in step 506. The confirmation request allows the user to confirm or discard the selection of the location category. In some embodiments, the confirmation request may also allow the user to enter additional information such as a location description, a captured image, etc.

In step 508 of the present embodiment, a determination is made as to whether confirmation is received from the user. If confirmation is received, the device location is determined in step 512. For example, the device location may be determined using a positioning device such as a GPS or mobile network towers. In this example, the device location may correspond to geographic coordinates (i.e., latitude and longitude) of the user device in a geographic coordinate system.

If confirmation is not received, a determination is made as to whether the confirmation request has timed out in step 510. If the confirmation request times out (i.e., a predetermined time period has passed), the process proceeds to step 512. In this case, the confirmation time elapsing is accepted as confirmation, allowing the point of interest to be confirmed with minimal input from the user. If the confirmation request fails to time out, the process may return to step 502. In some embodiments, the confirmation request time out period may be configured by the user of the user device.

In step 514, a location tag having the selected location category and the device location is sent to the application server. In some embodiments, the location tag may include additional information such as a location description, a captured image, positioning parameters (e.g., accuracy of device location, type of positioning device used, etc.), etc. The application server may then process the location tag as discussed above with respect to FIG. 4.

Figure 6:
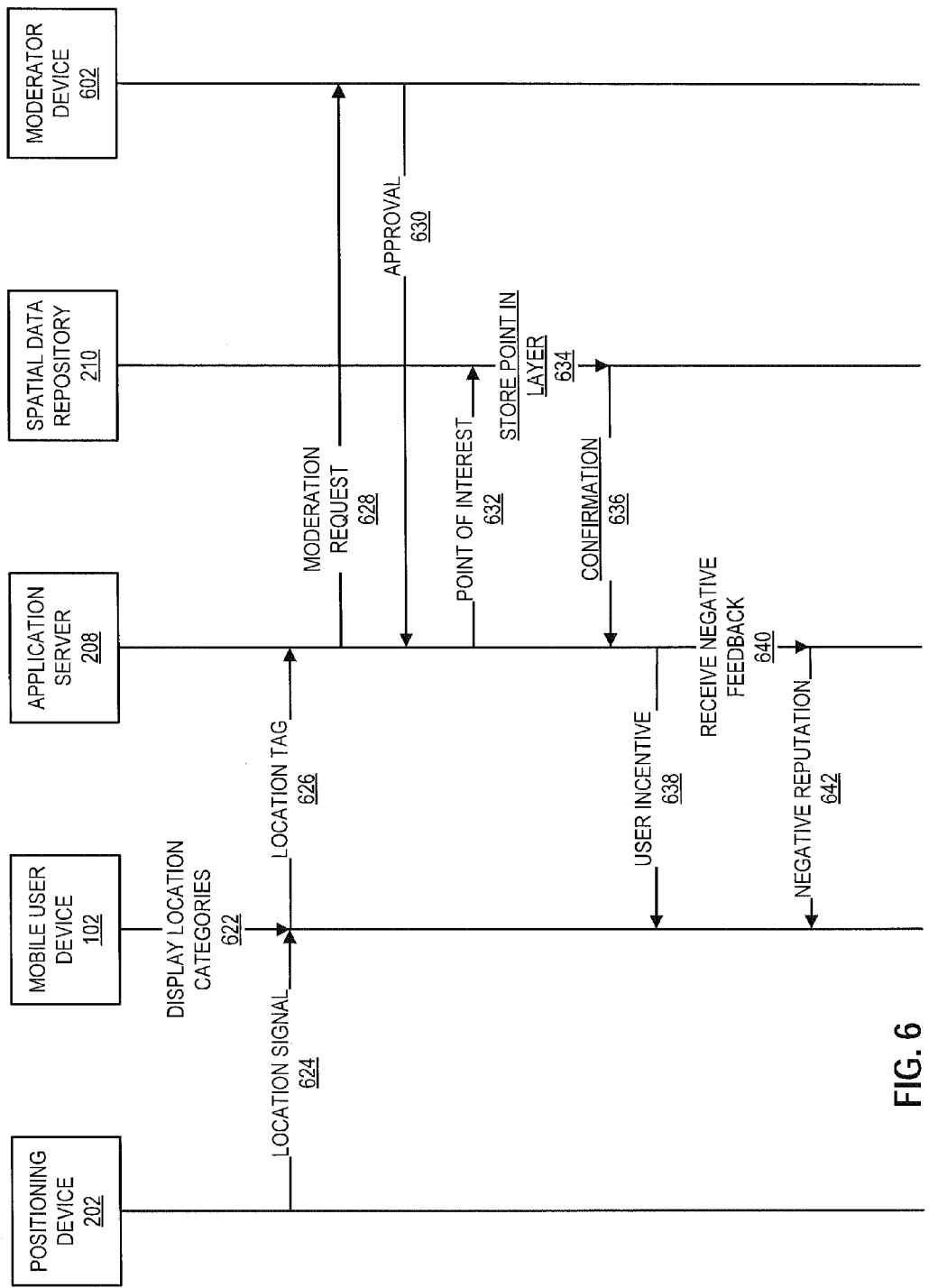
FIG. 6 shows a data flow diagram in accordance with one or more embodiments.

FIG. 6 shows another example in accordance with embodiments of obtaining crowd-sourced location information. More specifically, FIG. 6 shows an example of obtaining location information for an application server. The example includes a positioning device 202, a mobile user device 102, an application server 208, an spatial data repository 210, and a moderator device 602, which may be substantially similar to their corresponding components discussed above with respect to FIGS. 2 and 3A-3D.

In step 622 of the present embodiment, location categories are displayed on a mobile user device 102. For example, as a user of the mobile user device is traveling, the user may launch a collection application on the mobile user device when he identifies a potential point of interest. The collection application displays the location categories as selection buttons in a user interface. Examples of location categories include a restroom category, an ATM category, a public phone category, etc.

In response to the user selecting and confirming a location category for the potential point of interest, a location signal is received by the mobile user device 102 to determine a device location of the mobile user device 102 in step 624. The location signal may be an RF signal from a GPS or mobile network towers. In step 626 of the present embodiment, a location tag including the device location and the selected location category is sent from the mobile user device 102 to the application server 208. The location tag defines the potential point of interest to be processed by the application server 208.

In step 628 of the present embodiment, the application server 208 sends a moderation request for the location tag to a moderation device 602. The moderation request may include the location tag and user information (e.g., user identifier, user reputation, user collection history, etc.) associated with the user of the mobile user device 102. A moderator may review the location tag on the moderator device 602 to verify the validity of the potential point of interest based on related spatial data (e.g., satellite imagery, nearby points of interest, nearby roads, etc.) and the user information. For example, the moderator may review satellite imagery at the device location of the location tag to verify that the potential point of interest of the selected location category exists.

In step 630 of the present embodiment, approval of the location tag is sent from the moderator device 602 to the application server 208. In response to receiving the approval, the application server 208 confirms the point of interest and sends it to the spatial data repository in step 632. In step 634 of the present embodiment, the point of interest is stored in a points of interest layer in the spatial data repository. The point of interest may then be provided by the spatial data repository 210 in maps that include the points of interest layer. For example, the point of interest may be an ATM identified by the user of the mobile user device 102. In this example, other users of the application server 208 may request maps that include the identified ATM. Further, additional ATM's may be added as users submit additional location tags to the application server 208 thereby allowing the coverage of an ATM layer to be improved with crowd-sourced location information.

In step 636 of the present embodiment, the spatial repository 210 sends confirmation of the stored point of interest to the application server 208. At this stage, the application server 208 may award a user incentive to the user and send a notification of the user incentive to the mobile user device 102 in step 638. For example, the user incentive may be a social reward (e.g., achievement points, a virtual trophy, increased reputation, etc.) on a social networking service.

In step 640 of the present embodiment, negative feedback for the point of interest is received by the application server 208 from another mobile user device (not shown). For example, the negative feedback may specify that an ATM location does not exist at the location represented by the point of interest. If the negative feedback is confirmed (e.g., by receiving negative feedback from a threshold number of users, by a moderator, etc.), the reputation of the user is decreased, and a notification of the negative reputation is sent to the mobile user device 102 in step 642.

While obtaining crowd-sourced location information has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present embodiments may suitably comprise, consist or consist essentially of the elements disclosed and may be practiced in the absence of an element not disclosed.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

We claim:

1. A method of obtaining location information from user devices, the method comprising:
   receiving a first location tag from a first user device, the first location tag comprising a first location category and a first device location corresponding to a geographic location of the first user device;
   receiving a second location tag from a second user device, the second location tag comprising the first location category and a second device location corresponding to a geographic location of the second user device;
   receiving a third location tag from a third user device, the third location tag comprising the first location category and a third device location corresponding to a geographic location of the third user device;
   determining by one or more processors that whether a distance between the first device location and the second device location is less than a distance threshold;
   in response to determining that a distance between the first device location and the second device location is less than a distance threshold, storing the first device location as a first point of interest in a points of interest layer in response to determining that the distance is less than the distance threshold, the points of interest layer being associated with the first location category;
   generating a moderation request for the third location tag;
   receiving moderator approval of the third location tag; and
   in response to receiving moderator approval of the third location tag, storing the third device location as a first point of interest in the points of interest layer associated with the first location category.

2. The method of claim 1, further comprising:
   receiving a location image from the first user device; and
   performing optical character recognition on the location image to obtain location information associated with the first point of interest.

3. The method of claim 1, further comprising:
   receiving negative feedback from a fourth user device indicating that the first point of interest has incorrect data;
   obtaining a user history of a user of the first user device;
   modifying the user history to decrease a reputation of the user of the first user device; and
   deleting the first point of interest from the points of interest layer.

4. The method of claim 1, further comprising:
   receiving a plurality of location tags from a first plurality of user devices, each of the plurality of location tags comprising a second location category and an emergency location;
   determining the second location tag is an emergency location tag; and
   broadcasting a notification of the emergency location to a second plurality of user devices.

5. The method of claim 1, further comprising:
   sending to the first user device a confirmation that a user incentive has been awarded to a user of the first user device; and
   broadcasting a notification of the user incentive to a social network of the user.

6. A method of obtaining location information from user devices, the method comprising:
   displaying a plurality of location categories on a display of a first user device, each of the plurality of location categories being associated with a points of interest map layer;
   receiving a notification of a selected selection of a first location category of the plurality of location categories by a user of the first user device;
   determining by one or more processors a first device location corresponding to a geographic location of the first user device at or near a time of the selection of the first category by the user of the first user device based on a signal from a positioning device; and
   sending a location tag first point of interest dataset comprising the first device location and the selected location category to an application server,
   wherein the application server is configured to:
   receive a second point of interest dataset from a second user device, the second point of interest dataset comprising a second location category selected by a user of the second user device and a second device location corresponding to a geographic location of the second user device at or near a time of the selection of the second category by the user of the second device;
   determine whether the first and second categories are the same and that a distance between the first device location and the second device location is less than a distance threshold; and
   store the first device location as a first point of interest location in a points of interest layer associated with the first location category in response to determining that the first category and the second category are the same and that the distance is less than the distance threshold.

7. The method of claim 6, further comprising:
   obtaining a location image from a camera of the first user device, the location tag further comprising the location image.

8. The method of claim 6, further comprising:
   displaying a request for confirmation of the selected category on the display until a timeout period expires, the first location tag being sent to the application server in response to the timeout period expiring.

9. A system, comprising:
   a memory;
   a processor operatively connected to the memory;
   a device interface stored on the memory, wherein the device interface is executed by the processor to:
   receive a first location tag from a first user device, the first location tag comprising a first location category and a first device location corresponding to a geographic location of the first user device; and
   receive a second location tag from a second user device, the second location tag comprising the first location category and a second device location corresponding to a geographic location of the second user device;
   receive a third location tag from a third user device, the third location tag comprising the first location category and a third device location corresponding to a geographic location of the third user device;

a location manager module stored on the memory, wherein the location manager module is executed by the processor to:
- determine that whether a distance between the first device location and the second device location is less than a distance threshold;
- in response to determining that a distance between the first device location and the second device location is less than a distance threshold, store, in a spatial data repository, the first device location as a first point of interest in a points of interest layer associated with the first location category a spatial data repository to store the first device location as a first point of interest in a points of interest layer in response to determining whether the distance is less than the distance threshold, the points of interest layer being associated with the first location category
- generate a moderation request for the third location tag;
- receive moderator approval of the third location tag; and
- in response to receiving moderator approval of the third location tag, store, in the spatial data repository, the third device location as a first point of interest in the points of interest layer associated with the first location category.

10. The system of claim 9, wherein the device interface is further executed by the processor to receive a location image from the first user device, and wherein the location manager module is further executed by the processor to perform optical character recognition on the location image to obtain location information associated with the first point of interest.

11. The system of claim 9, wherein the device interface is further executed by the processor to receive negative feedback from a fourth user device indicating that the first point of interest has incorrect data, and wherein the location manager module is further executed by the processor to:
- obtain a user history of a user of the first user device;
- modify the user history to decrease a reputation of the user of the first user device; and
- delete the first point of interest from the points of interest layer.

12. The system of claim 9,
wherein the device interface is further executed by the processor to:
- receive a plurality of location tags from a first plurality of user devices, each of the plurality of location tags comprising a second location category and an emergency location; and
- broadcast a notification of the emergency location to a second plurality of user devices; and
wherein the location manager module is further executed by the processor to determine the second location tag is an emergency location tag.

13. The system of claim 9, wherein the device interface is further executed by the processor to:
- send to the first user device a confirmation that a user incentive has been awarded to a user of the first user device; and
- broadcast a notification of the user incentive to a social network of the user.

14. The system of claim 9, further comprising the first user device to:
- display a plurality of location categories on a display of the first user device, the plurality of location categories including the first location category associated with the points of interest layer;
- receive a selection of a first location category;
- determine the first device location based on a signal from a positioning device; and
- send the first location tag comprising the device location and the selected location category to the device interface.

15. A non-transitory computer readable medium having computer-executable program instructions embodied therein causing a computer processor to:
- receive a first location tag from a first user device, the first location tag comprising a first location category and a first device location corresponding to a geographic location of the first user device;
- receive a second location tag from a second user device, the second location tag comprising the first location category and a second device location corresponding to a geographic location of the second user device;
- receive a third location tag from a third user device, the third location tag comprising the first location category and a third device location corresponding to a geographic location of the third user device;
- determine that whether a distance between the first device location and the second device location is less than a distance threshold;
- in response to determining that a distance between the first device location and the second device location is less than a distance threshold, store the first device location as a first point of interest in a points of interest layer in response to determining that the distance is less than the distance threshold, the points of interest layer being associated with the first location category;
- generate a moderation request for the third location tag;
- receive moderator approval of the third location tag; and
- in response to receiving moderator approval of the third location tag, store the third device location as a first point of interest in the points of interest layer associated with the first location category.

16. The computer readable medium of claim 15, the computer-executable program instructions further causing the computer processor to:
- receive a location image from the first user device; and
- perform optical character recognition on the location image to obtain location information associated with the first point of interest.

17. The computer readable medium of claim 15, the computer-executable program instructions further causing the computer processor to:
- receive negative feedback from a fourth user device indicating that the first point of interest has incorrect data;
- obtain a user history of a user of the first user device;
- modify the user history to decrease a reputation of the user of the first user device; and
- delete the first point of interest from the points of interest layer.

18. The computer readable medium of claim 15, the computer-executable program instructions further causing the computer processor to:
- receive a plurality of location tags from a first plurality of user devices, each of the plurality of location tags comprising a second location category and an emergency location;
- determine the second location tag is an emergency location tag; and
- broadcast a notification of the emergency location to a second plurality of user devices.

19. The computer readable medium of claim 15, the computer-cxeeulablc program instructions further causing the computer processor to:

send to the first user device a confirmation that a user incentive has been awarded to a user of the first user device; and broadcast a notification of the user incentive lo a social network of the user.

20. A method of obtaining location information from user devices, the method comprising:

receiving a first point of interest dataset from a first user device, the first point of interest dataset comprising a first category selected by a user of the first user device and a first device location corresponding to a geographic location of the first user device at or near the selection a time of the first category by the user of the first device;

receiving a second point of interest dataset from a second user device, the second point of interest dataset comprising a second location category selected by a user of the second user device and a second device location corresponding to a geographic location of the second user device at or near a time of the selection of the second category by the user of the second device;

determining by one or more processors that the first and second categories are the same and that a distance between the first device location and the second device location is less than a distance threshold; and storing the first device location as a first point of interest location in a points of interest layer associated with the first location category in response to determining that the first category and the second category are the same and that the distance is less than the distance threshold.

* * * * *